United States Patent [19]

Kummer et al.

[11] Patent Number: 4,863,004

[45] Date of Patent: Sep. 5, 1989

[54] SPRING CLUTCH ASSEMBLY

[75] Inventors: Martin E. Kummer, Auburn; Richard Flotow, Butler, both of Ind.

[73] Assignee: Dana Corporation, Toledo, Ohio

[21] Appl. No.: 187,308

[22] Filed: Apr. 28, 1988

[51] Int. Cl.[4] .................. F16D 13/50; F16D 23/00
[52] U.S. Cl. ..................... 192/70.18; 192/70.3; 192/99 A; 192/109 R; 192/109 A
[58] Field of Search .............. 192/70.18, 70.3, 99 A, 192/109 A, 109 R

[56] References Cited

U.S. PATENT DOCUMENTS

| | | | |
|---|---|---|---|
| 1,821,150 | 9/1931 | Gamble | 192/70.3 |
| 1,912,649 | 6/1933 | Meyer | 192/109 A X |
| 2,515,277 | 7/1950 | Thelander et al. | 192/109 A |
| 3,323,624 | 6/1967 | Maurice | 192/109 A X |
| 3,653,475 | 4/1972 | Thelander | 192/99 A |
| 4,291,792 | 9/1981 | Henao | 192/109 A X |
| 4,667,799 | 5/1987 | Kummer | 192/70.3 X |
| 4,744,448 | 5/1988 | Maycock et al. | 192/109 A X |

Primary Examiner—Rodney H. Bonck

Attorney, Agent, or Firm—Willian Brinks Olds Hofer Gilson & Lione

[57] ABSTRACT

A clutch assembly having an annular cover member attached to an engine flywheel, an annular pressure plate which is floatingly attached to the cover member by a plurality of drive straps, a friction drive assembly which is splined to a transmission shaft for rotation therewith and sliding movement therealong, and which is positioned between the pressure plate and the engine flywheel, a plurality of radially extending release levers, each of which is pivotably attached to the cover member at a location between the ends of such release lever, and a belleville spring trapped between the cover member and the release levers to normally bias the release levers so that the outer end of each of them imposes a load on the pressure plate which tends to urge the pressure plate against the friction drive assembly and the friction drive assembly against the flywheel, each of the drive straps having an outwardly projecting extension which is positioned between the pressure plate and the outer end of an adjacent release lever to prevent the outer end of the release lever from imposing wear loads on the pressure plate.

22 Claims, 2 Drawing Sheets

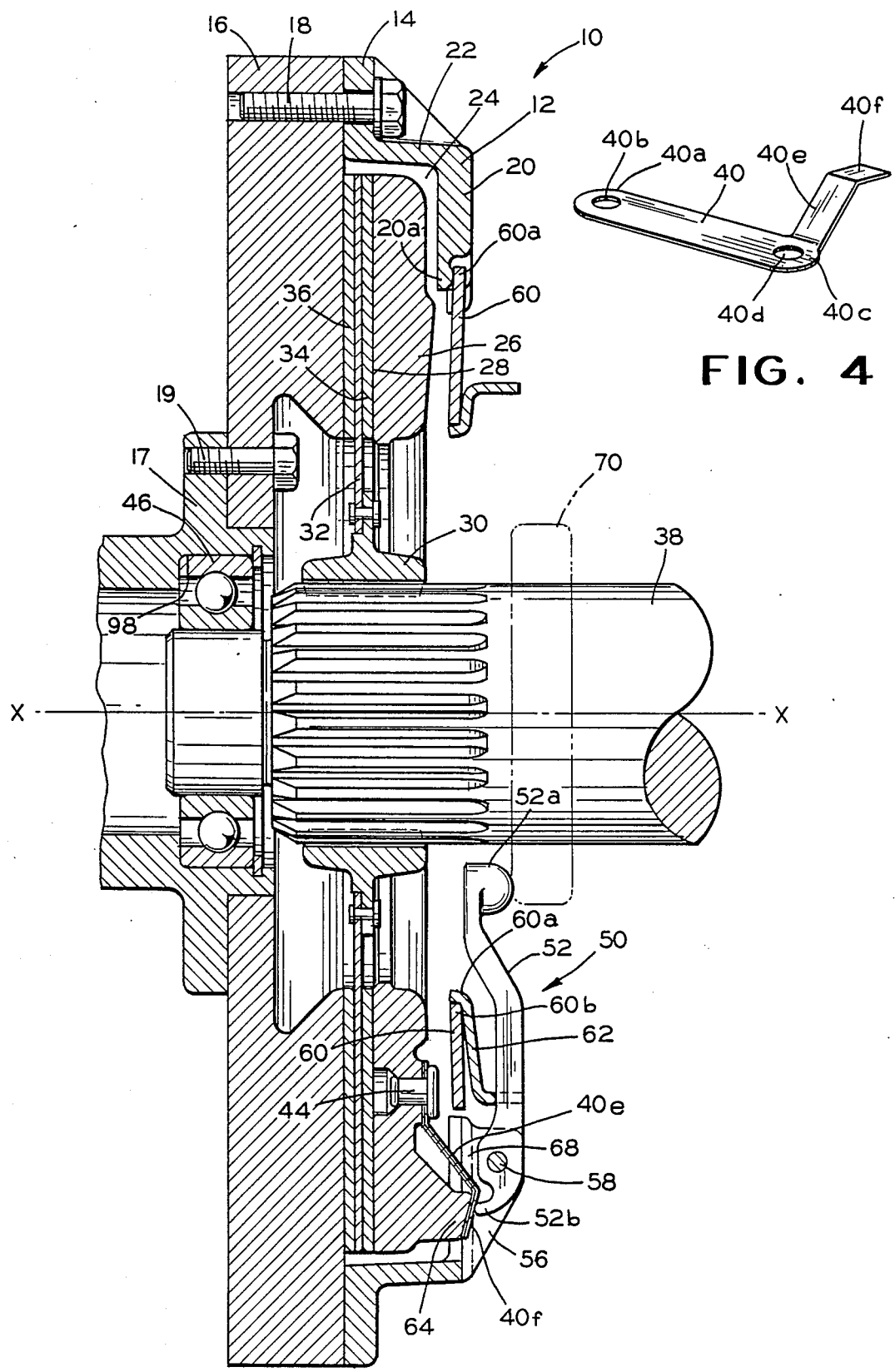

SPRING CLUTCH ASSEMBLY

BACKGROUND OF THE INVENTION

This invention relates to a spring clutch assembly. More particularly, this invention relates to a spring clutch assembly of the type which employs a plurality of externally located, and radially extending release levers.

A spring clutch assembly of the foregoing type is used in a motor vehicle to selectively transmit torque from a driving member, for example, the flywheel of an engine, to a driven member, for example, the input shaft of a transmission. A typical spring clutch assembly includes an annular cover member which is attached to the driving member, an annular pressure plate which is floatingly attached to the cover member, and an annular friction disc assembly which is attached to the driven member. The floating attachment of the cover member and the pressure plate to one another is by means of a plurality of flexible drive straps, an end of each of which is attached to the cover member and the other end of each of which is attached to the pressure plate. The pressure plate and the disc assembly are positioned coaxially with one another and coaxially with the cover member along an axis of rotation of the clutch assembly that includes such pressure plate and disc assembly, and the pressure plate and the disc assembly are movable relative to one another along such axis to selectively frictionally engage one another or to be disengaged from one another. An annular disc spring, frequently called a "belleville spring", is trapped between the pressure plate and a plurality of externally located radially extending release levers which are spaced around the clutch assembly and which are pivotally attached to the cover member to normally bias the pressure plate into engaging relationship with the disc assembly. Heretofore, it has been customary for the end of each release lever which loads the pressure plate to bear directly against the pressure plate, and this has led to excessive pressure plate wear due to the fact that a pressure plate for such a clutch assembly, typically, is formed from a rather soft metallic material, such as gray cast iron.

SUMMARY OF THE INVENTION

A spring clutch assembly according to the present invention avoids the problem of excessive pressure plate wear resulting from contact with portions of externally located release levers by utilizing drive straps each of which is formed from a flexible wear-resistant steel, with an extension of the end of each such drive strap that is secured to the pressure plate to lie between the pressure plate and the end of the release lever which would otherwise engage the pressure plate, to thereby impose the wear loads from the release lever on the drive strap extension rather than on the pressure plate. Further, each drive strap extension is slightly sprung relative to the adjacent surface of the pressure plate, to provide a cushioning effect between the release lever and the pressure plate.

BRIEF DESCRIPTION OF THE DRAWING

FIG. 2 is a sectional view, at an enlarged scale, taken on line 2—2 of FIG. 1;

FIG. 4 is a perspective view of a component of the clutch assembly of FIGS. 1–3.

DETAILED DESCRIPTION OF THE PREFERRED EMBODIMENT

Figure 1:
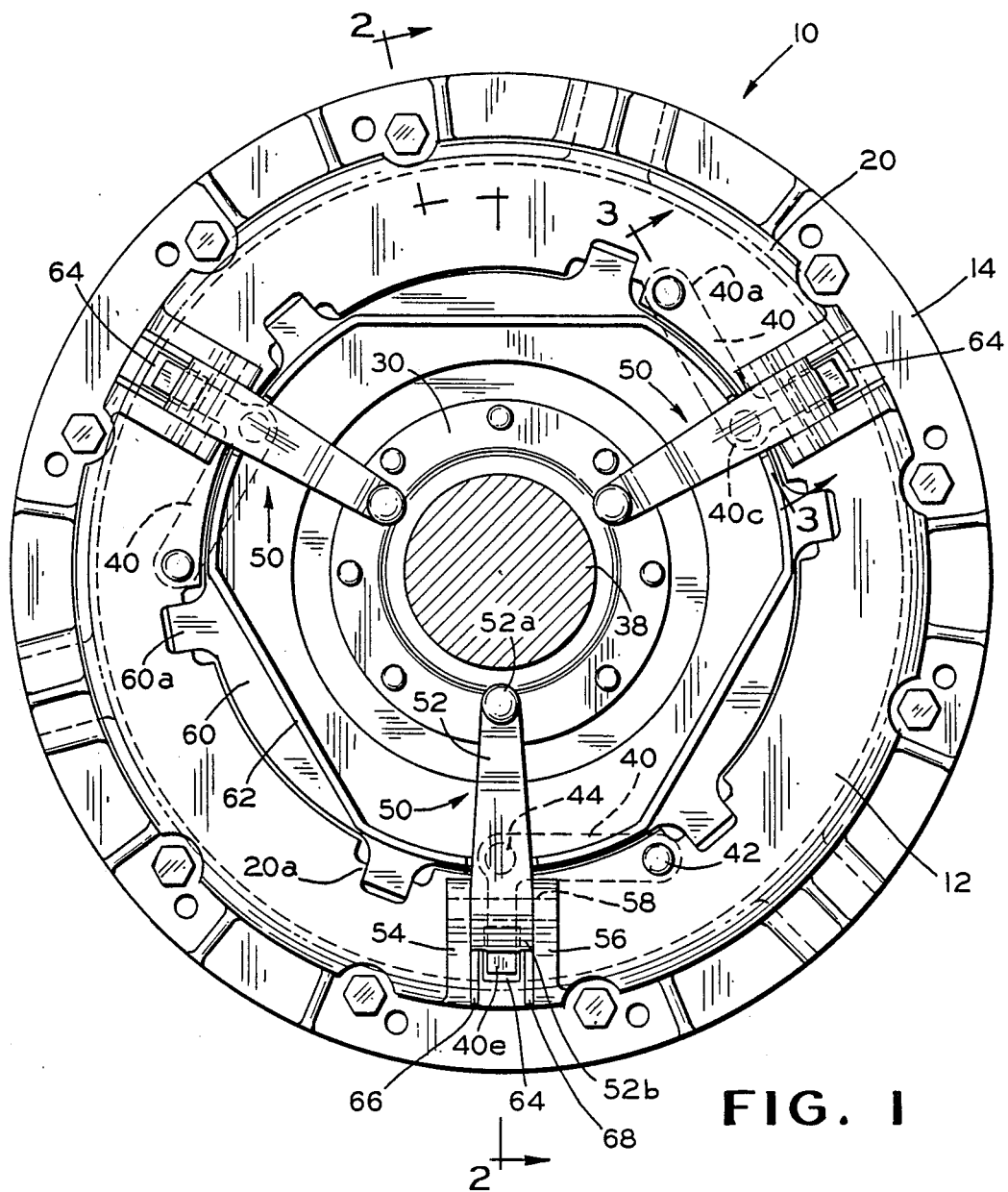
FIG. 1 is an end elevational view of a spring clutch assembly according to the preferred embodiment of the present invention.

A clutch assembly according to the present invention is identified generally by reference numeral 10 in FIGS. 1 and 2 and has a central axis X—X, as seen in FIG. 2. The clutch assembly 10 includes an annular cover member 12 which has a peripheral flange 14 that is secured to the face of an engine flywheel 16 by a plurality of circumferentially-spaced bolts, only one of which, the bolt 18, is shown in the drawing (FIG. 2). The flywheel 16, in turn, is attached to the crankshaft 17, shown fragmentarily, of an engine, otherwise not shown, by a plurality of bolts, only one of which, the bolt 19, is shown in the drawing. Thus, the cover member 12 rotates with the flywheel 16 during the operation of the engine, and this rotation takes place about the central axis X—X.

The cover member 12 also has a radially interior annular portion 20 which is axially-spaced from the peripheral flange 14 and which is connected to the peripheral flange 14 by an axially extending portion 22. Thus, the cover member 12 defines an annular space 24 with the flywheel 16, and an annular pressure plate 26 is positioned in the annular space 24. Further, a friction disc assembly 28 is positioned in the annular space 24 between the pressure plate 26 and the flywheel 16, and is adapted to be clamped between the pressure plate 26 and the flywheel 16.

The friction disc assembly 28 includes a central hub 30, an annular support plate 32 which is secured to the central hub 30, and annular friction facings 34 and 36 secured to opposite sides of an outer peripheral portion of the support plate 32. The central hub 30 is splined to the a transmission input shaft 38 near the end of the transmission input shaft 38, with the friction facing 36 positioned between the pressure plate 26 and the flywheel 16, and the end of the transmission input shaft 38 is journaled in a bearing 46 which is positioned in a recess 48 in the crankshaft 17 to permit the crankshaft 17 and the flywheel 16 to rotate independently of the input shaft 38. The splined connection between the central hub 30 of the friction disc assembly 28 and the transmission input shaft 38 permits the friction disk assembly 28 to move in an axial direction relative to the input shaft 38, along the central axis X—X, while being rotatable with it.

Figure 3:
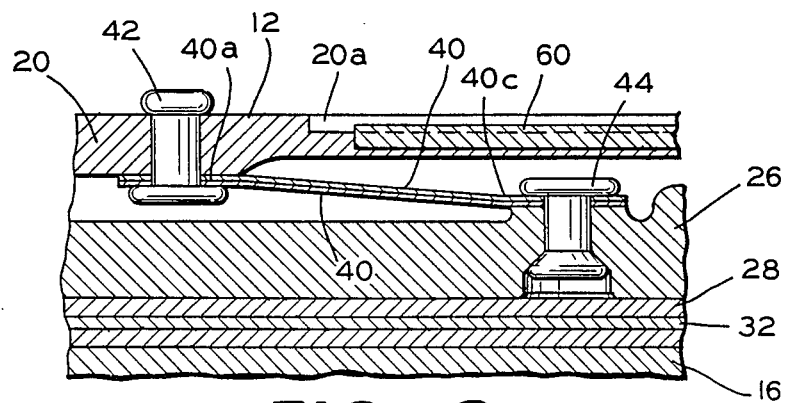
FIG. 3 is a sectional view, at an enlarged scale, taken on line 3—3 of FIG. 1.

The pressure plate 26 is movable along the central axis X—X such that it can be moved into engagement with the friction disk assembly 28 to clamp the friction disk assembly 28 firmly against the flywheel 16, and to thereby drivingly connect the flywheel 16 to the transmission input shaft 38. A plurality, shown as being three in number, of circumferentially-spaced flexible drive straps 40 rotatably connect the pressure plate 26 to the cover member 12 and permit limited movement along the central axis X—X between the pressure plate 26 and cover member 12. Actually, a multiplicity of drive straps can be superimposed at each position to provide a suitable spring constant between the pressure plate 26 and the cover member 12, and to that end two such drive straps 40 are shown at each location, as is clearly shown in FIG. 3. Each drive strap 40 has a cover member end 40a which is secured to the cover member 12 by a rivet 42 that passes through an aperture 40b in the cover member end 40a of the drive strap 40, a pressure plate end 40c which is secured to the pressure plate 26 by a rivet 44 which passes through an aperture 40d in the pressure plate end 40c of the drive strap 40, and, for purposes which will hereinafter be explained more fully, an extension 40e which projects radially outwardly from the pressure plate end 40c of the drive strap 40.

A plurality, shown as being three in number, of circumferentially-spaced lever operating mechanisms, each of which is generally identified by reference numeral 50, is provided to move the pressure plate 26 relative to the cover member 12 in a direction extending along the central axis X—X to thereby move the pressure plate 26 into and out of engagement with the friction disc assembly 28, and specifically into and out of engagement with the friction facing 34 component thereof. Each lever operating mechanism 50 includes a radially extending release lever 52 which is positioned outside the cover member 12 and which is pivotally attached between and to spaced-apart lugs 54 and 56 of the cover member 12 by a pin 58 which extends through aligned apertures in the lugs 54 and 56 and the release lever 52. See especially the lever operating mechanism 50 at the six o'clock position in FIG. 1. Each release lever 52 has an inner end 52a and an outer end 52b, and is pivotally attached to the lugs 54 and 56 at a location which is between the inner end 52a and the outer end 52b, and which is much closer to the outer end 52b than to the inner end 52a. Thus, any load which is applied to the inner end 52a results in a motion of the outer end 52b in a direction which is opposed to the direction of the applied load and which is much smaller in magnitude than the motion of the inner end 52a which results from such applied load.

An annular "belleville spring" 60, which is frequently referred to as a "belleville washer", is provided between the release levers 52 and the cover member 12 to normally urge the outer end 52b of each of the release levers 52 toward the pressure plate 26, and to thereby urge the pressure plate 26 toward the flywheel 16. The belleville spring 60 has an outer portion 60a which is restrained by a portion 20a of the interior portion 20 of the cover member 12, and an inner portion 60b which engages a collector ring 62. The collector ring 62 serves to equally distribute the load from the belleville spring 60 to the release levers 52 and is similar in function to that described in U.S. Pat. No. 4,332,214 (R. A. Flotow), the disclosure of which is hereby incorporated by reference. Thus, the collector ring 62 engages each of the release levers 52 at a location between the inner end 52a thereof and the pin 58 which passes through such release lever, and a frustoconical intermediate portion 60c which extends between the inner portion 60a and the outer portion 60b.

Each of the release levers 52 is arranged to have its inner end 52a engaged by an annular clutch release bearing 70 which is movable along the central axis X—X to selectively disengage the clutch assembly by moving against the inner end 52a of each of the release levers 52. This motion of the clutch release bearing 70 against the inner end 52a of each of the release levers 52 causes each of the release levers 52 to pivot about the pin 58 which passes therethrough, so that the outer end 52b of such release lever 52 moves away from the pressure plate 26 and thereby allows the pressure plate 26 to move away from the friction disk assembly 28.

The frictional loads which are imposed by the release levers 52 on the pressure plate 26, and specifically at the outer end 52b of each such release lever 52, which result from the repeated disengagement and reengagement of the lever operating mechanism 50 by the clutch release bearing 70, would normally tend to cause wear on the pressure plate 26 since each such release lever 52 is normally constructed of a relatively hard material, such as a steel forging, and since the pressure plate 26 is normally constructed of a relatively soft metallic material, such as gray cast iron. In the present invention, such frictional wear of the plate 26 is avoided by the extension 40f of each flexible drive strap 40, which extension 40f is positioned to lie between the pressure plate 26 and the outer end 52b of the release lever which is adjacent thereto, specifically between a raised lug 64 on the pressure plate 26 and the outer end 52b of the release lever 52, a transitional portion 40e being provided between the pressure plate end 40c and the extension 40f of the drive strap 40 to accommodate the raised lug 64. Thus, the wearing forces resulting from the movement of the outer end 52b of each release lever 52 due to the repeated disengagement and reengagement of the lever operating mechanism 50 by the clutch release bearing 62 are imposed on the extension 40f of the drive straps 40. These wearing forces result in considerably less wear on the drive strap extension 40f than would occur on the pressure plate 26, since each of the drive straps 40, due to other design demands, is normally formed from a hard flexible material such as a spring steel stamping. Preferably, each drive strap extension 40f is slightly sprung relative to the adjacent raised lug 64 of the pressure plate 26, that is, is out of contact with such raised lug 64 in a relaxed or unloaded state of such drive strap extension 40f, to provide a cushioning effect between the raised lug 64 and the outer end 52b of the adjacent release lever, and thereby reduce the magnitude of any impact loads which would otherwise be imposed on the raised lug 64 and any impact loads which would otherwise be imposed on the friction disc assembly by the pressure plate 26.

The clutch assembly 10 according to the present invention, if desired, can be provided with a stop travel feature to limit the axial travel of the pressure plate 26 relative to the cover member 12, for example, due to excessive wear of the friction facings 34 and 36. The preferred embodiment of the invention which is illustrated in the drawing has such a feature in the form of spaced-apart raised stops 66 and 68 on the cover member 12, on opposite sides of each pressure plate raised lug 64 and close thereto, and the raised stops 66 and 68 are adapted to be contacted by a portion of each release lever 52 which is near the outer end 52b thereof as the outer end 52b is required to move more than a predetermined distance to the left in the orientation of the clutch assembly 10 depicted in FIG. 2, to force the drive strap extension 40e into engagement with the raised lug 64.

Although one preferred embodiment of this invention has been described and illustrated herein, the following claims are intended to cover various other embodiments which fall in the spirit and scope thereof.

We claim:
1. A clutch assembly comprising:
an annular cover member for attachment to a rotatable driving member for rotation with the driving member about an axis of rotation;

an annular pressure plate within said annular cover member between said annular cover member and the rotatable driving member;

a friction drive assembly positioned between the driving member and said annular pressure plate, said friction drive assembly being adapted to be attached to a rotatable output member for rotation therewith about the axis of rotation and being slidable with respect to the output member along the axis of rotation into and out of engagement with the driving member;

at least one flexible drive strap, said at least one flexible drive strap having a first end which is attached to said annular over member and a second end which is attached to said pressure plate, said at least one flexible drive strap coupling said annular cover member and said annular pressure plate to one another for rotation about the axis of rotation and permitting limited movement of said annular pressure plate with respect to said annular cover member along the axis of rotation;

at least one radially extending lever, said at least one radially extending lever having an inner end and an outer end and being pivotally attached to said annular cover member at a pivot axis between said inner end and said outer end, said outer end being adapted to impose a load against said annular pressure plate which would tend to move said annular pressure plate along the axis of rotation toward the rotatable driving member;

resilient biasing means normally biasing said at least one radially extending lever to cause said outer end to impose said load against said annular pressure plate, said inner end of said at least one radially extending lever being adapted to be engaged by clutch release means to pivot said outer end away from said annular pressure plate against the effect of said resilient biasing means; and impact absorbent wear prevention means positioned between said annular pressure plate and said outer end of said at least one radially extending lever to prevent said outer end from causing excessive wear of said annular pressure plate;

said impact absorbent wear prevention means comprising an extension of said at least one flexible drive strap, said at least one flexible drive strap including said extension being formed integrally in a single piece.

2. A clutch assembly according to claim 1 wherein said extension is located at said second end of said at least one flexible drive strap and extends generally radially outwardly therefrom.

3. A clutch assembly according to claim 2 wherein said extension of said at least one flexible drive strap has a relaxed state and wherein said extension is out of contact with said portion of said annular pressure plate in its relaxed state, whereby said extension provides a cushioning effect between said outer end of said radially extending lever and said pressure plate.

4. A clutch assembly according to claim 3 wherein said pressure plate is formed from a relatively soft metallic material, wherein said at least one flexible drive strap including said extension is formed from a material which is harder than said relatively soft metallic material, and wherein said at least one radially extending lever is formed from a material which is harder than said relatively soft metallic material.

5. A clutch assembly according to claim 2 wherein said pressure plate is formed from a relatively soft metallic material, wherein said wear prevention means is formed from a material which is harder than said relatively soft metallic material, and wherein said at least one radially extending lever is formed from a material which is harder than said relatively soft metallic material.

6. A clutch assembly according to claim 5 wherein said relatively soft metallic material is gray cast iron.

7. A clutch assembly according to claim 2 wherein said resilient biasing means is a belleville spring.

8. A clutch assembly according to claim 7 and further comprising collector ring means, said belleville spring being trapped between said annular cover member and said collector ring means said collector ring means, engaging said at least one radially extending lever at a location between said inner end and said pivot axis.

9. A clutch assembly comprising:

an annular cover member for attachment to a rotatable driving member for rotation with the driving member about an axis of rotation;

an annular pressure plate within said annular cover member between said annular cover member and the rotatable driving member;

a friction drive assembly positioned between the driving member and said annular pressure plate, said friction drive assembly being adapted to be attached to a rotatable output member for rotation therewith about the axis of rotation and being slidable with respect to the output member along the axis of rotation into and out of engagement with the driving member;

a plurality of flexible drive straps spaced apart in a circumferential array around the axis of rotation, each of said flexible drive straps having a first end which is attached to said cover member and a second end which is attached to said pressure plate, said plurality of flexible drive straps coupling said annular cover member and said annular pressure plate to one another for rotation about the axis of rotation and permitting limited movement of said annular pressure plate with respect to said annular cover member along the axis of rotation;

a plurality of circumferentially spaced apart and radially extending levers, each of said levers having an inner end and an outer end and being pivotally attached to said annular cover at a pivot axis between said inner end and said outer end, said outer end being adapter to impose a load against said annular pressure plate which will tend to move said annular pressure plate along the axis of rotation toward the rotatable driving member;

resilient biasing means resiliently biasing each of said plurality of levers to cause said outer end of said each of said plurality of levers to impose said load against said annular pressure plate, said inner end of said each of said plurality of levers being adapted to be engaged by clutch release means to pivot said outer end away from said annular pressure plate against the effect of said resilient biasing means; and impact absorbent wear prevention means positioned between said annular pressure plate and said outer end of said each of plurality of levers to prevent said outer end of said each of said plurality of levers from causing excessive wear of said annular pressure plate, said impact absorbent wear prevention means comprising an extension of at least one of said plurality of flexible drive straps, said at least one of said plurality of flexible drive straps including said extension being formed integrally in a single piece.

10. A clutch assembly according to claim 9 wherein said impact absorbent wear prevention means further comprises an extension of another of said plurality of flexible drive straps, said another of said plurality of flexible drive straps including said extension thereof being formed integrally in a second single piece.

11. A clutch assembly according to claim 10 wherein said extension of said at least one of said plurality of flexible drive straps is located at said second one of said at least one of said plurality of flexible drive straps and extends generally radially outwardly therefrom, and wherein said extension of said another of said plurality of flexible drive straps is located at said second end of said another of said plurality of flexible drive straps and extends generally radially outwardly therefrom.

12. A clutch assembly according to claim 11 wherein said extension of said at least one of said plurality of flexible drive straps has a relaxed state, wherein said extension of said at least one of said plurality of flexible drive straps is out of contact with said annular pressure plate in said relaxed state of said at least one of said plurality of flexible drive straps, wherein said extension of said another of said plurality of flexible drive straps has a relaxed state, and wherein said extension of said another of said plurality of flexible drive straps is out of contact with said annular pressure plate in said relaxed state of said another of said plurality of flexible drive straps, whereby said extension of said at least one of said plurality of flexible drive straps provides a cushioning effect between said annular pressure plate and the outer end of one of said plurality of radially extending levers and said extension of said another of said plurality of flexible drive straps provides a cushioning effect between said annular pressure plates and the outer end of another of said plurality of radially extending levers.

13. A clutch assembly according to claim 12 wherein said annular pressure plate is formed from a relatively soft metallic material, wherein said at least one of said plurality of flexible drive straps is formed from a material which is harder than said relatively soft metallic material, wherein said another of said plurality of flexible drive straps if formed from a material which is harder than said relatively soft metallic material, wherein said one of said plurality of radially extending levers is formed from a material which is harder than said relatively soft metallic material, and wherein said another of said plurality of radially extending levers is formed from a material which is harder than said relatively soft metallic material.

14. A clutch assembly according to claim 13 wherein said relatively soft metallic material is gray cast iron.

15. A clutch assembly according to claim 9 wherein said extension is located at said second end at said at least one of said plurality of flexible drive straps and extends generally radially outward therefrom.

16. A clutch assembly according to claim 15 wherein said extension has relaxed state and wherein said extension is out of contact with said annular pressure plate in said relaxed state, whereby said extension provides a cushioning effect between said annular pressure plate and the outer end of one of said plurality of radially extending levers.

17. A clutch assembly according to claim 12 wherein said annular pressure plate is formed from a relatively soft metallic material, wherein said wear prevention means is formed from a material which is harder than said relatively soft metallic material, and wherein each of said plurality of radially extending levers is formed from a material which is harder than said relatively soft metallic material.

18. A clutch assembly according to claim 17 wherein said relatively soft metallic material is gray cast iron.

19. A clutch assembly according to claim 12 wherein said resilient biasing means is a belleville spring.

20. A clutch assembly according to claim 19 and further comprising collector ring means, said belleville spring being trapped between said cover member and said collector ring means, said collector ring means engaging each of said radially extending levers at a location between said inner end and said pivot axis of said each of said plurality of radially extending levers.

21. A clutch assembly according to claim 12 wherein said plurality of flexible drive straps comprises at least three flexible drive straps and wherein the number of radially extending levers in said plurality of radially extending levers equals the number of flexible drive straps in said plurality of flexible drive straps.

22. A clutch assembly comprising:
an annular cover member for attachment to a rotatable driving member for rotation with the driving member about an axis of rotation;
an annular pressure plate within said annular cover member between said annular cover member and the rotatable driving member;
a friction drive assembly positioned between the driving member and said annular pressure plate, said friction drive assembly being adapted to be attached to a rotatable output member for rotation the with about the axis of rotation and being slidable with respect to the output member along the axis of rotation into and out of engagement with the driving member;
at least one flexible drive strap, said at least one flexible drive strap having a first end which is attached to said annular cover member and a second end which is attached to said pressure plate, said at least one flexible drive strap coupling said annular cover member and said annular pressure plate to one another for rotation about the axis of rotation and permitting limited movement of said annular pressure plate with respect to said annular cover member along the axis of rotation;
at least one radially extending lever, said at least one radially extending lever having an inner end and an outer end and being pivotally attached to said annular cover at a pivot axis between said inner end and said outer end, said outer end being adapted to impose a load against said annular pressure plate which would tend to move said annular pressure plate along the axis of rotation toward the rotatable driving member;
resilient biasing means normally biasing said at least one radially extending lever to cause said outer end to impose said load against said annular pressure plate, said inner end of said at least one radially extending lever being adapted to be engaged by clutch release means to pivot said outer end away from said annular pressure plate against the effect of said resilient biasing means; and
said at least one flexible drive strap having an extension, said at least one flexible drive strap including said extension being formed integrally in a single piece, said extension being positioned between said annular pressure plate and said outer end of said at least one radially extending lever to prevent said outer end from causing excessive wear of said annular pressure plate.

* * * * *

UNITED STATES PATENT AND TRADEMARK OFFICE
CERTIFICATE OF CORRECTION

PATENT NO.  :  4,863,004
DATED       :  September 5, 1989
INVENTOR(S) :  Martin E. Kummer and Richard Flotow It is certified that error appears in the above-identified patent and that said Letters Patent is hereby corrected as shown below:

Column 6, line 50, change "adapter" to -- adapted --.

Column 8, line 31, change "the with" to -- therewith --.

Signed and Sealed this

Twenty-sixth Day of June, 1990

Attest:

HARRY F. MANBECK, JR.

*Attesting Officer*   *Commissioner of Patents and Trademarks*